March 28, 1939. C. E. BERSTLER 2,152,428
VALVE
Filed Sept. 27, 1937
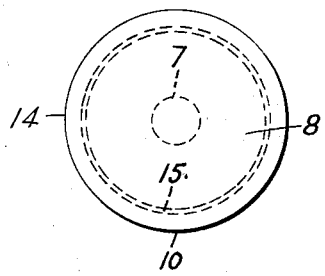
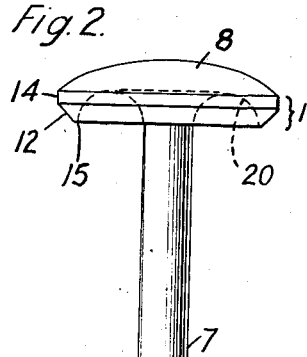
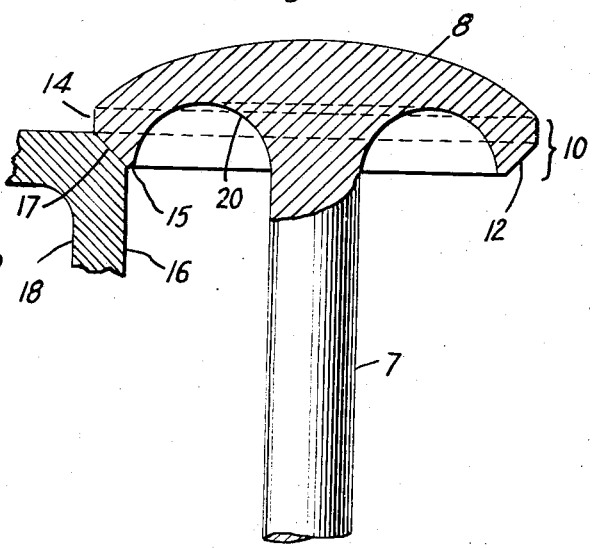
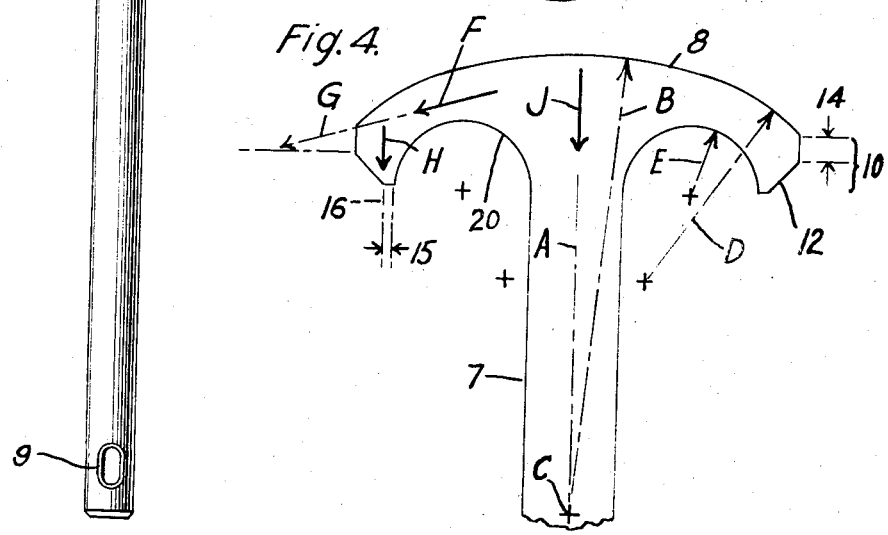
INVENTOR.
Carl E. Berstler
BY F. H. Miller
ATTORNEY.

Patented Mar. 28, 1939

2,152,428

UNITED STATES PATENT OFFICE 2,152,428

VALVE

Carl E. Berstler, Reading, Pa., assignor of eighteen and seventy-five one hundredths per cent to Raymond T. Scull, Wyomissing Hills, Pa., eighteen and seventy-five one hundredths per cent to A. W. Golden, Wyomissing, Pa., and eighteen and seventy-five one hundredths per cent to John T. Bair and eighteen and seventy-five one hundredths per cent to George S. Weinerth, both of Reading, Pa.

Application September 27, 1937, Serial No. 165,877

8 Claims. (Cl. 123—188)

My invention relates to valves, and particularly to valves for internal combustion engines; this application being a continuation in part of my copending application, Serial No. 110,453, for Valve structures, filed November 12, 1936.

As set forth generally in the copending application, internal combustion engine valves, as heretofore constructed, are subject to trouble caused by sustained heat, by the form and relation of the valve heads, stems and seats, and other factors, causing burning, pitting and warpage of the valves, gas leakage, and other disadvantages resulting in premature ignition, loss of pick up, power and efficiency, and delay, inconvenience and repair costs.

Prior valves have the connecting portions, between the heads and the stems, so close to the valve seats as to excessively heat the heads and associated elements, and are so constructed as to cause the heads to warp and collapse in service, which a valve of the same amount and kind of metal, constructed in accordance with my inventions, will not do.

Among the prior art valves, is one of a type having a head substantially in the form of a flat disc, whereby the first yield of the head to the pull of the stem, and the resistance of the valve-block seat, is a direct and instantaneous collapsing action toward the valve port, a tubular valve-seating skirt, on a valve head of such flat-disc character, does not avoid the direct inwardly-collapsing tendency.

Another prior art valve, although of arched contour in vertical-plane central section, is so constructed that the lateral component forces, imposed thereon during the valve-seating or closing action, are transmitted directly against the valve and block seats, such that the head tends to spread and collapse very readily.

Feather edges of the heads are soon damaged by heat, whereby to reduce the efficiency of the valves, and, in valves of the above-mentioned prior art types, to hasten the early collapse caused by a flat disc head, with, or without, a valve-seating skirt, or an arched head without such skirt.

Also, valves heretofore known are connected to the stems so close to the planes of the valve seats, or have such masses of metal in or near the space surrounding the stems adjacent to the seats, as to add to the excessive heat already induced. Warpage of the prior art valves, lifts the peripheries or seat portions of the valves off the block seats, with the consequent loss of compression, frequent seat grinding, and other disadvantages resulting from this cause.

Former valves are constructed with heads of flat and other shapes, causing back pressure, or with edges and other features causing gas turbulence, resulting in vibration and losses of various kinds. The former flat valve seats, or seats pressing against flat block seats, readily become eccentric, with the resulting damaging effects from this cause.

An object of the invention hereof is to overcome the above-mentioned objections and disadvantages by improving the valve of the above-mentioned copending application in various features for certain purposes, as will hereinafter appear.

Another object of the invention is to retain such of the advantages of the invention of the copending application as are essential to an effective value of the type hereof, and to combine therewith a certain cooling and strengthening element, which has other purposes, as will herein appear, as well as to more effectively utilize the novel features in certain applications.

Another object of the invention is to better adapt the valve of my above-mentioned copending application to valve seats of various diameters and surface angles, for purposes of the present invention, and to provide a more pronounced valve-seating skirt for resolving the forces of the pull of the stem and the reaction of the seat into forces substantially parallel to the stem, whereby to likewise avoid spread of the head, but to do so more effectively for the purposes hereof, and to render it very much stronger than valves of prior art types having the same amount and kind of metal.

With such objects in view, as well as other advantages which may be incident to a utilization of the improvement, the invention comprises the elements and combinations thereof hereinafter set forth and claimed, with the understanding that the several necessary elements constituting the same may be varied in proportion, texture and arrangement without departing from the spirit and scope of the invention.

The valve of the copending application, embodies, in combination with a trussed valve head portion, a substantially tubular valve-seating skirt on the head extending along the stem, whereby the forces of the pull of the stem, and the reaction of the valve-block seat, which are resolved radially between the stem and the skirt in the trussed portion, are directed along, or substantially parallel to, the stem; this feature avoiding the imposition of the lateral forces of the trussed portion at the contact surfaces of the valve and block seats, by having the arch of the truss directed from the stem outwardly and over the valve seat, spaced therefrom, and the valve skirt directed precipitately, or protruding, from the line of the arch to direct the forces substantially parallel to the stem. In the structure, as thus constituted, the tubular skirt may be thereby defined as an element which exists independently of, or in addition to, the truss shape.

In the example given in the copending application, the valve-seating surface is substantially perpendicular to the tubular seating portion of the valve, whereby to avoid feather edges, and to have other advantages in certain applications, but which, although it is adapted to the angles of certain standard valve blocks now in use, and to special valve blocks, could not, for instance, be as readily applied to valve-block seats sloping very steeply, or nearly vertical, because of the reduction of the truss or arch which this might involve, with the head otherwise retained in its simple form shown, if at all. Also, the tubular valve-seating skirt may, in certain applications, which the present invention is intended to accomplish, be more pronounced, and slightly differently shaped.

By the invention hereof, the construction of the head is similar to that of the copending application in all of its essential features, such as the trussed substantially mushroom head having the tubular valve-seating skirt, with substantially all of the advantages incident thereto, but materially extends the usefulness thereof, in certain applications, in that it allows for a wider variety of valve-seat slopes, thereby better adapting the invention to standard and special valves of a wide variety of kinds, and has a feature which further strengthens, and better cools, the elements, and compensates for the application of the invention to sharper valve-seat slopes by the new cooling feature.

In the drawing:

Figure 1 is a top plan view, to actual scale, of a valve of the invention, in vertical position with the head at the top, as exemplified in one application to a standard block seat having a forty-five degree slope to the vertical and horizontal, it being understood that the valve may be operated in other positions, and this fact to be taken into consideration in each instance in the description where reference is made to vertical, horizontal or related positions and directions;

Fig. 2 is a view, in side elevation, of the valve of Fig. 1;

Fig. 3 is a view, partially in vertical-plane central section, and partially in side elevation, as viewed in Fig. 2, of the valve, drawn to twice the actual scale, as applied in the example given; and Fig. 4 is a contour diagram in the nature of a vertical-plane central section templet or pattern of the device of Fig. 3, drawn to the same scale.

Referring to the drawing, the device, which is shown merely as one of various forms which the invention may take, comprises, in general, a stem 7, of usual cylindrical form, having a head 8 at the top end, and a chamfered slot 9 near its bottom end for the reception of a keeper pin for a usual disc-like keeper around the stem above the slot 9.

The head 8 has an outer or upper surface made up of a compound arc, in vertical-plane central section, as will be more fully explained, and in the form of an arch, trussed against the forces of the stem, and the reaction of the valve or valve-block seat, having a tubular valve-seating skirt 10, including a sloping valve-seating surface 12, and a short band-like portion 14, between the surface 12 and one of the arc portions of the upper surface. The head also has an inner peripheral portion 15, for radially inwardly overhanging an inner portion 16 of a seat 17 on a valve-block portion 18, and, in vertical-plane central section, has a short arch line 20 extending, from the portion 15, upwardly beyond the top horizontal plane of the valve-seating surface 12, and into the surface of the stem 7.

As seen in Fig. 4, the contour of the head, in vertical-plane central section, is directed from the longitudinal axis A of the stem and head, at each side thereof, successively along a top, or topmost, surface having a long radius B centered in the stem 7 on a point C of the axis A. This topmost surface extends generally horizontally to a position intermediate the axis and the outer periphery of the head, where it joins, and continues along, an arc having a shorter radius D veering from the generally horizontal or long-arc surface line of the radius B, downwardly toward the vertical. The outline of the head continues from the shorter arc of the radius D, along the short outside line of the portion 14 extending generally along, or parallel, to the stem, and along the line of the valve-seating surface of the seat 17 sloping downwardly and inwardly toward the stem. From the seat 17, the contour continues along a generally horizontal short bottom line of the overhang 15, and along the short arch line 20, having a radius E, into the surface of the stem. The top surface of other valve heads of the invention may be variously modified according to the sizes of the valves and combustion chambers of different engines, whereby to obtain effects equivalent to the compound arc surface as set forth.

In the above-described construction, in addition to the extension of the short underside arch 20 to a position above the top horizontal plane of the valve-seating surface 12, as noted by comparison with the top surface of the block portion 18, the arch of the head extends generally in the direction of an arrow F which, if extended, as along a dot-and-dash line arrow G, intercepts the skirt 10 substantially at its top, spaced from the upper, or near, side of the valve seat 12, and continues to a position outwardly on the top surface of the block portion 18 from the head. An arrow H indicates that the forces of the pull of the stem and the reaction of the valve and block seats, under the seating action of the valve, are substantially parallel to the forces of the pull of the stem, indicated by an arrow J, from a point well above the valve and block seats, so that any spreading tendency of the trussed portion of the head is opposed by the tubular skirt, like a band or hoop, and reduced or avoided at the seats such that little or no lateral force is expended at the seats, except that which is imposed by the angular relation of the seats themselves to the parallel forces in the stem and the skirt.

In the example given, which is adapted to a standard valve of a well-known make of present-day automobile, the valve is constructed of silichrome steel, although other construction may be employed, the radius B is one and three-quarter inches, the radius D is thirteen sixteenths of an inch, the radius E is two hundred and seventy-five thousandths of an inch, the slope of the valve seat is forty-five degrees to the vertical and to the horizontal, and is one eighth of an inch in each of the vertical and horizontal directions, the overhang 15 is one thirty-secondth of an inch, the stem is three hundred and thirty-nine thousandths of an inch in diameter, the overall length, or height, of the head is one half inch, and the overall length of the valve, including the head and the stem, is six and seven-sixteenths inches. These features are, of course, only by way of example, and may be different in other instances.

Contrary to the almost, if not entirely, instantaneous collapsing movement of a valve head of the flat-disc type, upon the first substantial pull of the stem pressing the head against the block seat, especially after the head is hot, the valve of my invention is trussed against such action, and, in turn, has this truss anchored, or bound, all about its periphery, by the tubular valve-seating skirt. By having this skirt substantially parallel to the stem, the lateral spreading forces of the truss are converted into forces in the skirt substantially parallel to the stem, whereby the spread of the truss is prevented, and imposition of the truss forces on the valve seat is prevented. A trussed head, without a skirt, similar to the skirt 10, will spread readily, and almost as quickly as a flat-head valve, especially when hot. Thus, by the construction of the present invention, the valve is made very much stronger, and caused to overcome many of the disadvantages hereinbefore pointed out.

A very important feature of the invention hereof, over the invention of the copending application, resides in the provision of the overhanging shoulder 15, whereby to provide sufficient body of metal at the lower edge of the valve seat to avoid a feather edge, no matter what the angle of the valve seat 12, and particularly in the case of steep angles whereby this edge would otherwise become sharply feathered, and burn very readily. Thus, each of a plurality of valves having a like feature is adapted to have its valve-seating surface extend in any one of a selection of directions, or along any one of a selection of slopes, different from the direction of the surface, or the slope, of another of the valves across the seating portion in vertical-plane central section of the valve free from a feather edge at each end of such line, or, in other words, at the lowermost inner and outer peripheral edges of the valve-seating portion. Also, in certain cases, the one valve body, after having been constructed as a blank, to the extent that the seating surface is not yet determined or formed, may have any one of a selection of directions or slopes. The overhang also gives greater body to the skirt, strengthens it materially, and allows for grinding, which in this case is seldom or never necessary, in addition to making the valve as a unit very much stronger, and aiding in, and adding to, the advantages of the valve otherwise.

Another feature of advantage over the valve of the copending application resides in the more pronounced valve-seating skirt, emphasized by the surface 14 which may be of greater or less height or width in different cases.

By having the surface 20 of substantially toroidal shape, as shown in the example given, extending well above the top limits of the valve seat, a metal-free space is provided around and near the stem, between the latter and the valve seat, whereby, in marked contrast to most, if not all, valves, in standard use, to provide a very great cooling effect and to avoid the intense heating at probably the most vital position in an internal combustion engine.

The line of the inner surface arch 20 cooperates with the outer arch line of the radius B to define an arch of the head, and cooperates with the precipitate outer surface line of the head veering or departing from the generally horizontal direction of the line of the radius B, and extending downwardly through the remainder of the height of the head to define the tubular valve-seating portion or skirt, which is in addition to the arch of the head, or, in other words to provide the head with an arch or truss, and a tubular portion existing independently of the arch of the head.

The head, as a whole, is of marked stream-line character, reducing resistance to the flow of gases, avoiding troubles incident to the turbulence caused by the valves in commercial use, and avoids the back pressure of flat and other valves.

In the example of the invention given in the co-pending application, principally as a means for avoiding feather edges at the valve seat, the valve-seating surface is shown at substantially right angles to the valve-seating skirt. Such construction, in substantially the form shown, may be applied to valves having seat slopes of substantial variation from the slope shown, and still operate effectively in accordance with the purpose of the invention of avoiding edges of material feather character, but, in valves having seat slopes of certain approach to the vertical, it would so lower, or reduce, the arch as to render less effective or nullify, the truss effect, which is an essential feature of the invention.

This factor is eliminated in the present invention by the overhanging portion 15 whereby, irrespective of the slope of the block seat, the lower edge of the valve seat will not be feathered, so that herein, by the combination of the truss, the skirt and the overhang, the broader concept is of more universal application, even though a valve of that concept may be constructed without the overhang, and have a valve seat at substantially right angles to the skirt, or depart therefrom within the range of the invention, or be constructed for the purpose of avoiding edges of less feathered character than the trussed and sloping-seat valves of the prior art.

The valve is of easy manufacture, is made to fit any engine of any standard make of automobile, and can be installed as readily as replacing the old valves, whereby to give any engine more power, better pick up, greater freedom from valve troubles and expense, and give it other advantages which no valve of any other kind, of which I am aware, can give.

The head, by reason of the truss, the skirt, the overhang, and other features, is so constituted as to be much more highly resistant to lifting of the valve seat from any part of the block seat, and to the collapsing, or inside-out turning, tendency which readily occurs in other valves. It will operate several times longer than ordinary valves, without showing traces of burning, warping or pitting, and avoids cracking under conditions of heat simulating those of actual hard service, and the application of force much greater than it is ever called upon to endure in service.

It is to be understood that the specific material, contour, dimensions and other features can be varied over relatively wide limits for engines of the same or different sizes and kinds, and that although I have shown and described only one specific example of many that are contemplated, these and other changes can be effected without changing the spirit or scope of the invention as set forth in the appended claims.

I claim as my invention:

1. An internal combustion engine valve comprising a stem, a head trussed against the forces of the stem and the reactions of the valve seat under the valve-seating action, a tubular valve-seating skirt on the head, and an inner peripheral portion of the valve-seating skirt for radially inwardly overhanging the valve-block seat.

2. An internal combustion engine valve comprising a stem, a head at one end of the stem trussed against the forces of the stem and the reactions of the seat under the valve-closing action, a tubular valve-seating skirt on the head, a valve-seating surface on the skirt sloping inwardly toward the other end of the stem, and an inner peripheral portion of the valve-seating skirt for radially inwardly overhanging a valve-block seat.

3. An internal combustion engine valve comprising a stem, a head at one end of the stem having a portion trussed against the forces of the stem and the reactions of the valve seat under the valve closing action, a tubular valve-seating skirt on the head, and a valve-seating surface on the skirt sloping relative to the skirt and substantially free from radial forces and reactions except those caused by the sloping valve-seating surface itself under said valve closing action.

4. An internal combustion engine valve comprising a stem, and a head at one end of the stem, said head having in longitudinal section a contour extending successively from its center along an arch line of the outer head surface toward the outer periphery of the head, and hence toward the other end of the stem along an outer surface line adjacent to said periphery extending precipitately toward the other end of the stem, and including a portion sloping toward said other end of the stem along a line of the valve-seating surface, thence along a line extending radially inwardly beyond the radially inner limits of the valve seat, and thence along a line extending toward said outer surface end and radially inwardly on an inner surface line of the head to the stem, said inner surface line cooperating with said outer arch line to define an arch, and cooperating with said precipitate line to define a substantially tubular portion in addition to said arch.

5. An internal combustion engine valve comprising a stem, and a head at one end of the stem having a truss portion, and a tubular valve-seating skirt on the truss portion arranged to resolve the forces of the stem and the reactions of a valve-block seat into forces along the skirt substantially parallel to the stem, and lateral component forces through the truss portion along lines extending outwardly from said one, toward said other end of the stem, to a position in the skirt spaced from the valve seat, the skirt having an inner peripheral shoulder extending radially inwardly from the valve seat for radially inwardly overhanging the block seat.

6. An internal combustion engine valve comprising a stem, and a head at one end of the stem having a trussed portion arched toward the other end of the stem, said trussed portion being formed along a path such that if continued beyond the outer periphery of the valve, it would pass the position of the valve seat spaced from the near side thereof, and extend to a position radially beyond the seat, and embodying at the outer limits of the truss a portion protruding therefrom toward the other end of the stem from said path having a valve-seating surface and an inner peripheral portion, for radially inwardly overhanging the inner periphery of a valve-block seat.

7. An internal combustion engine valve comprising a stem, and a substantially mushroom head at the top of the stem trussed against the forces of the stem and the reactions at the valve seat under the valve-closing action, and having a tubular valve-seating skirt, said head having a top surface portion directed in vertical-plane central section successively from the center of said head at each side thereof along a top surface arch centered in the stem and extending generally horizontally to a position intermediate the stem axis and the outer periphery of the head, from said position veering from said top surface downwardly toward the vertical, along a valve-seating surface sloping downwardly and inwardly toward the stem, along a generally horizontal short bottom surface forming from said valve-seating surface an inner peripheral portion for radially inwardly overhanging a valve-block seat, and along a short arch from said bottom surface on the inner surface of the overhanging portion of the skirt, and on the under surface of the head above the top horizontal plane of the valve seat extending into the surface of the stem.

8. An internal combustion engine valve comprising a stem, and a substantially mushroom head at the top of the stem trussed against the forces of the pull of the stem and the reactions of the valve and block seats under the valve-closing action, and having a tubular valve-seating skirt, said head having a top surface directed in vertical-plane central section successively from the center of the head at each side thereof along a surface arch centered in the stem extending generally horizontally to a position intermediate the stem axis and the outer periphery of the head, extending further along an outer surface arch veering from said top-surface downwardly toward the vertical, thence along a short outside surface extending generally parallel to the stem, extending further along a valve-seating surface sloping downwardly and inwardly from said short outside surface, thence along a generally horizontal short bottom surface from said valve-seating surface on an inner peripheral portion for radially inwardly overhanging a valve-block seat, and along a short arch from said bottom surface on the inner surface of the overhanging portion of the skirt and on the under surface of the head above the top horizontal plane of the valve seat and extending into the surface of the stem.

CARL E. BERSTLER.